(No Model.) 2 Sheets—Sheet 1.

H. E. PRIDMORE.
RELIEF RAKE FOR GRAIN BINDERS.

No. 435,519. Patented Sept. 2, 1890.

Witnesses
Wm A. Skinkle,
Chas. E. Gorton.

Inventor
Henry E. Pridmore
By his Attorneys
Parkinson & Parkinson

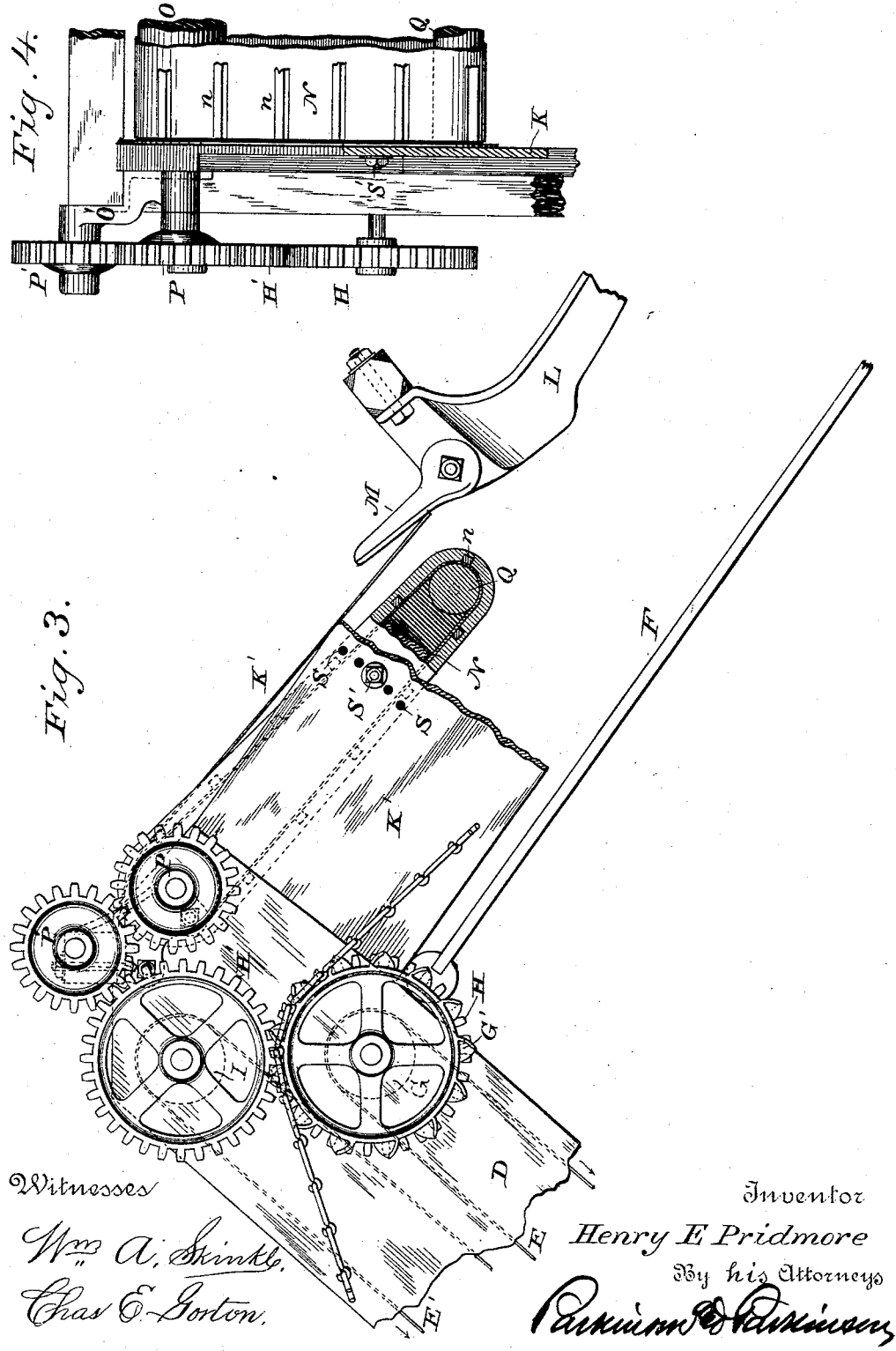

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

RELIEF-RAKE FOR GRAIN-BINDERS.

SPECIFICATION forming part of Letters Patent No. 435,519, dated September 2, 1890.

Application filed September 15, 1888. Serial No. 285,527. (No model.)

*To all whom it may concern:*

Be it known that I, HENRY E. PRIDMORE, a citizen of the United States, residing at Chicago, in the county of Cook and State of Illinois, have invented certain new and useful Improvements in Relief-Rakes for Grain-Binders, of which the following is a specification.

My invention has for its object to aid the heads of the grain in their descent along the grain-chute or binding-table; and it consists in combining with the grain-chute in a binder an overlying relief-rake arranged above the path of the heads of the grain, a hinge-connection between said rake and its supports at the inner end, and adjusting devices at its outer end, whereby the distance between said outer end and the decking of the chute may be increased or diminished.

Figure 1:
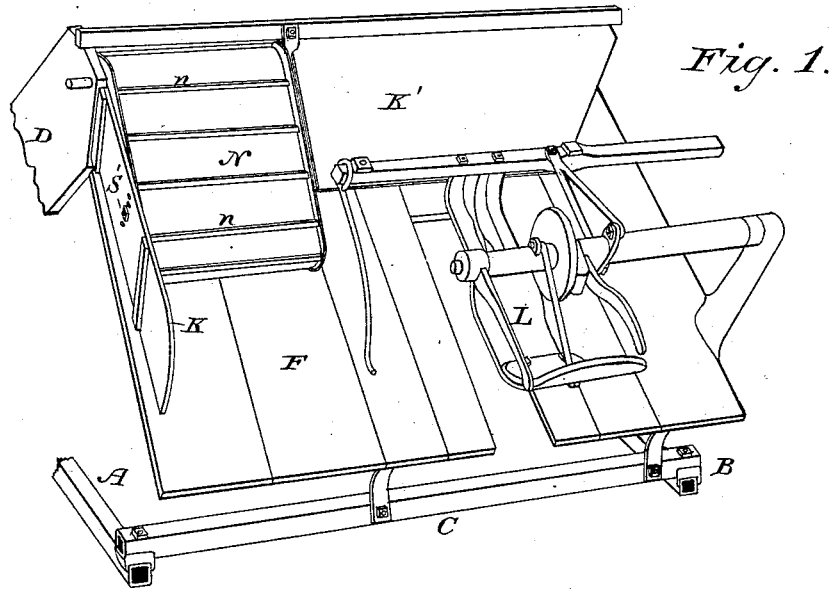
Figure 2:
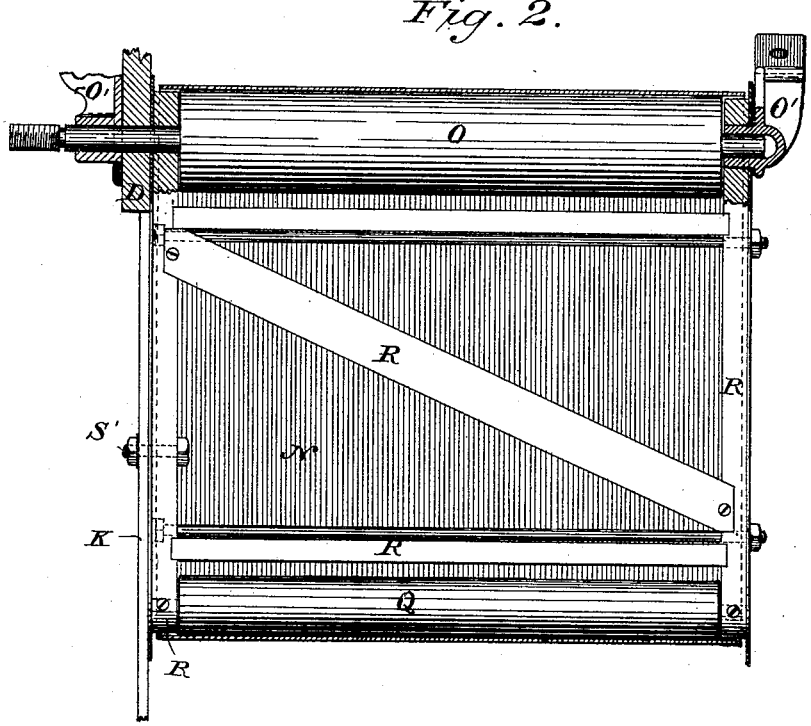

In the drawings, Figure 1 is a perspective view of so much of a grain-binder embodying my invention as is necessary to an understanding thereof. Fig. 2 is a plan of the relief-rake and part of the harvester with the upper ply of the rake-apron removed and the wood and metal work around the bearings partly broken away to more clearly exhibit its connection to the harvester. Fig. 3 is an elevation of part of the harvester-elevator and binder from the rear, with the relief-rake in position and partly broken away, showing the gear-train by which the rake is driven; and Fig. 4 is an enlarged detail view of said rake and its driving-train.

A represents the rear sill of the elevator-frame in a modern harvester of a type very generally used, B the front sill, and C the outside girt, these parts being shown for the purpose of the present description as formed of square pipes, but obviously capable of being of any known structure suitable for the purpose.

D represents the rear elevator strut or board, having the lower elevator-apron E, and the upper overlying apron E', between which the grain is carried from the platform conveyer to the head of the chute-board or grain-deck F, down which it passes to the binder. The lower elevator-apron is mounted at its head on a drum G, driven, as usual in Marsh harvesters, by means of a sprocket-wheel G' on a gudgeon at one end and having a spur-gear H, which meshes with and drives another equal spur-gear H' on a gudgeon from the head-drum I of the upper elevator-apron, the opposing surfaces of the two aprons thus moving in the same direction and at equal speeds.

Heretofore it has been customary to place a swinging spring-pressed head-board at the rear of the grain-chute to guide the heads of the grain and prevent scattering. This was carried forward by its spring so as to press always against the heads. In my present invention I employ, instead of this swinging head-board, a stationary head-board K, fixed to the elevator-frame or harvester so as not to interfere with the back-and-forth adjustments of the binding attachments and standing parallel with the rear line of the grain-chute, or, in the case of a side-delivery harvester, at right angles to the line of draft. The usual shield or deflector K' is also employed above the grain-chute and extending down, practically, to the breast-plate L, which forms the top of the binding-receptacle proper and guards and protects the knotter-head, the gap between said breast-plate and shield being, if necessary, closed by a suitable bridge M, secured to the plate and resting upon the top of the shield; but instead of extending the whole width or nearly the whole width of the elevator, as heretofore, this shield is now cut away so as to leave a space between its rear edge and the head-board of a width depending upon the width of the relief-rake. Such relief-rake is herein shown as composed of an endless apron N, having transverse slats *n* upon its exposed face, and mounted at the inner end upon a driving-drum O, parallel with the head-drum of the upper elevator-apron and journaled in bearings in brackets O', secured to the ridge-bar of the elevator-frame. This driving-drum for the relief-rake has a gudgeon, which receives a pinion P, meshing with an idle pinion P', which in turn meshes with and is driven by the spur-gear on the gudgeon of the upper elevator-apron drum, the train being properly speeded that the relief-rake may move somewhat faster than the elevator-aprons. A second or idle drum Q, which may be of less diameter and is journaled in bearings in the rake-frame R, but pivots upon and swings about the gudgeons of the opposite or driving drum, carries the outer end of the relief-rake, the construction much resembling the butter-apron now in use, except that instead of the apron being arranged in a vertical plane it is herein arranged in a horizontal plane, and instead of being located at the butt-end of the grain-receptacle it is located at the head end. The front edge of the relief-rake and of its frame is adjacent to and parallel with the rear edge of the deflector, while the rear edge of the rake is close alongside the stationary head-board. Thus the rake fills the gap between the deflector and head-board and serves as a continuation of the former.

The head-board has a segmental series of perforations S, through which takes a pin or bolt S' from the frame of the rake, whereby the outer end of the latter may be adjusted up and down, so that it may always be in contact with the heads of the grain and feed them forward toward the delivery end of the chute. By withdrawing the pin or bolt the relief-rake may be left free to float upon the grain.

Instead of the bolt, it is evident that the frame may be adjusted by a lever in manner similar to the butter-apron now in use.

The inner end of the relief-rake or apron is in close proximity to and parallel with the head of the upper elevator-apron as it passes around its drum in its return; but, owing to the interposition of the idle pinion, the surfaces of the two aprons move in opposite directions at the adjacent points and the slats of the relief-rake sweep close to the slats of the elevator-apron, brushing away all straw which may be adhering thereto and tend to be carried up and over with said apron in its return movement.

I do not confine myself to the specific construction of the relief-rake herein described, as it will be evident to those familiar with the art that various forms of rakes already well known in harvesting-machines may be substituted for it; nor do I confine myself to a relief-rake which at the same time serves as a stripper for the upper elevator-apron, nor to its employment with any particular form of harvester or binder; but,

Having thus described my invention, what I claim, and desire to secure by Letters Patent, is—

The combination, substantially as hereinbefore set forth, with the grain-chute in a binder, of an overlying relief-rake arranged above the path of the heads of the grain, a hinge-connection between said rake and its supports at the inner end, and adjusting devices at its outer end, whereby the distance between said outer end and the decking of the chute may be increased or diminished.

HENRY E. PRIDMORE.

Witnesses:
JAS. H. HASKINS,
HENRY B. UTLEY.